(No Model.)
W. W. WAINWRIGHT.
PACKING BOX FOR ROTARY BLOWERS.
No. 525,776. Patented Sept. 11, 1894.
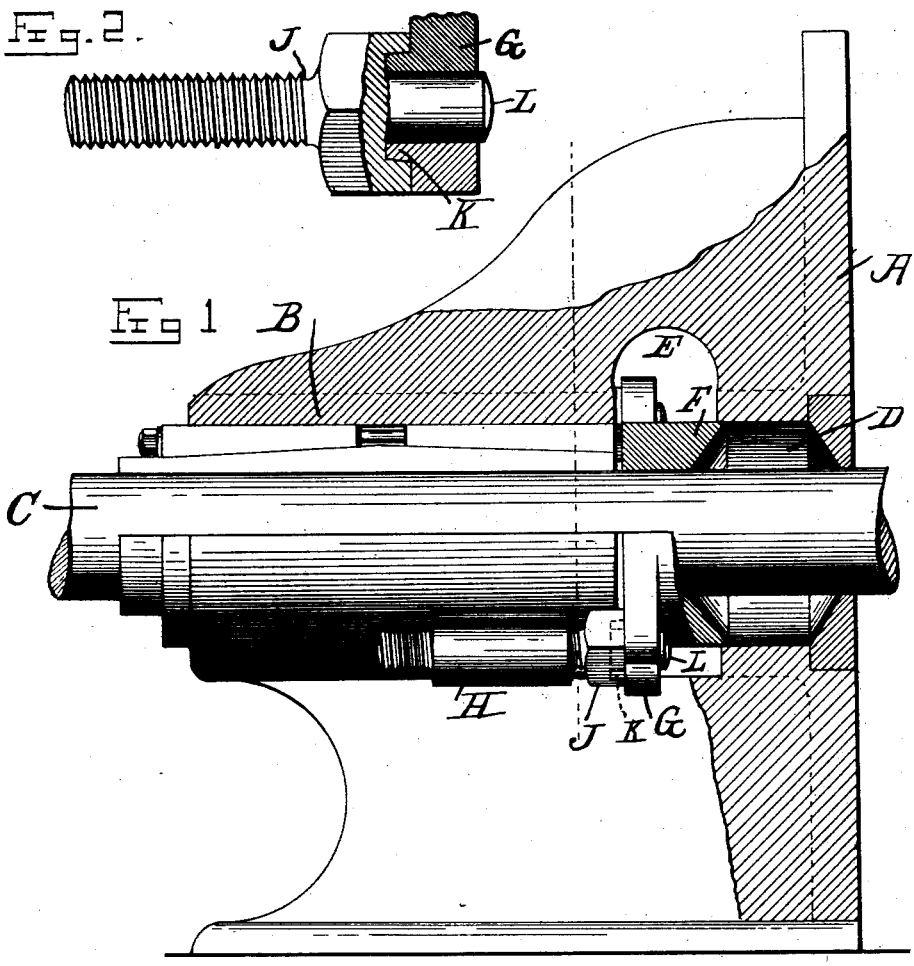
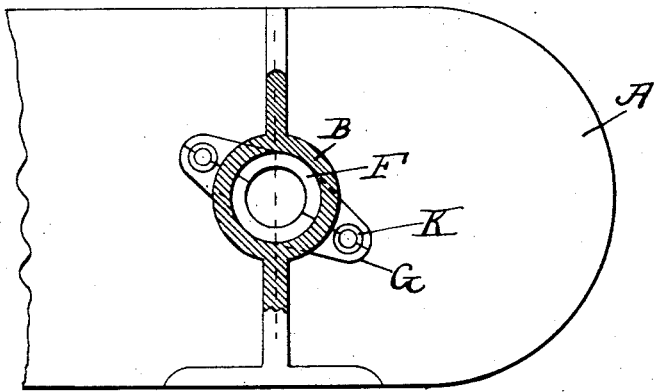
Witnesses:
E. R. Shipley.
C. M. Shushaw.
William W. Wainwright Inventor
by James W. See
Attorney

UNITED STATES PATENT OFFICE.

WILLIAM W. WAINWRIGHT, OF CONNERSVILLE, INDIANA, ASSIGNOR TO P. H. & F. M. ROOTS CO., OF SAME PLACE.

PACKING-BOX FOR ROTARY BLOWERS.

SPECIFICATION forming part of Letters Patent No. 525,776, dated September 11, 1894.

Application filed April 30, 1894. Serial No. 509,449. (No model.)

*To all whom it may concern:*

Be it known that I, WILLIAM W. WAINWRIGHT, of Connersville, Fayette county, Indiana, have invented certain new and useful Improvements in Packing-Boxes for Rotary Blowers, of which the following is a specification.

In rotary blowers the shafts of the rotary impellers project out through the heads of the casings and their projecting portions are provided with suitable bearings and driving gears. When such blowers are used for certain purposes it is important that there should be no leakage where the shaft projects out of the casing, and it is with the packing glands used at these points that my present invention has to do.

My improvements will be readily understood from the following description taken in connection with the accompanying drawings, in which—

Figure 1, is a side elevation, part vertical section, of the casing-head, bearing and stuffing box of a rotary blower, the construction showing my present invention; Fig. 2, a side elevation of one of the packing screws, part vertical section; and Fig. 3, a face view of the parts shown in Fig. 1, viewed from the left-hand of Fig. 1, parts being in vertical section.

In the drawings:—A, indicates the usual casing-head of a rotary blower; B, one of the bearings connected therewith, the bearing in this instance being shown as provided with an adjustable box; C, the shaft; D, the stuffing-box or packing cavity around the shaft; where the shaft passes outward through the casing head, this stuffing-box opening outwardly toward the journal-bearing; E, a space or recess between the stuffing-box and the inner end of the journal-box to permit of the presence of the gland and to permit the insertion of the packing; F, the packing-gland fitting the shaft and the stuffing-box and split diametrically so as to be in two pieces, the length of the gland being substantially equal to the width of the space E; G, the lugs upon the packing-gland for the packing-screws, these lugs being so disposed that the cut which separates a gland into two half pieces passes through these lugs and centrally through the holes in the lugs; H, lugs upon the journal-box in line with the holes in the lugs of the gland, the lugs H being tapped for the packing-screws; J, the packing-screws, threaded into the lugs H and presenting their heads against the lugs G of the gland; K, annular bosses projecting from the face of the lugs G, around the holes therein, these bosses seating in recesses in the faces of the heads of the packing-screws J; and L, portions of the screws J projecting inwardly beyond the heads thereof and through the holes in the lugs of the glands.

By turning up the screws J the gland will be forced in compressively upon the packing. By turning back the screws J the gland F may be withdrawn, and by turning the screws back till the recesses in their heads are free from the bosses K the gland may be entirely removed, it then being in two disunited halves, the recesses in the heads of the screws engaging the bosses K holding the two halves together when the gland is in place. The gland may thus be readily removed to permit access to the stuffing-box to insert the packing. In rotary blowers it is of high importance that the journal-bearing be kept up as close as practicable to the casing-head and this requirement interferes with the practicability of finding room to withdraw the gland a proper distance from the stuffing-box to permit the proper insertion of packing. The present arrangement permits the journal-box to be carried up very close to the stuffing-box. The projecting portion L of the packing screws, and the holes in the lugs G for those projecting portions, are not absolutely necessary as the recesses engaging the bosses will unite the two halves of the gland and properly apply the pressure to the gland, but the projecting portion L will be found a convenience in steering the parts to proper position. So far as merely forcing the gland into the stuffing-box is concerned, the studs ordinarily employed with nuts upon them would of course be the equivalent of the screws J with their heads, the nuts instead of the heads in such case being recessed to surround the bosses K; but the arrangement of the screws J with the recessed heads formed upon them, the screws threading through lugs rigidly supported in front of the gland, is of special advantage in permitting freedom of access to the stuffing-box when the gland is out and away, as the screws do not then cross the recess E to interfere with access to the stuffing-box.

I claim as my invention—

1. The combination, substantially as set forth, of a stuffing-box, a gland therefor provided with lugs having facial bosses and split diametrically through the bore of the gland and through said bosses, and screws arranged to force the gland into the stuffing-box and having recesses engaging around said bosses and holding the two halves of the gland together.

2. The combination, substantially as set forth, of a stuffing-box, a packing-gland therefor provided with lugs G, having facial bosses and split diametrically through the bore of the gland and through said bosses, threaded lugs as H rigidly supported in front of the gland and in line with said bosses, and screws threaded through said threaded lugs and having heads with recesses surrounding said bosses and holding the two halves of the gland together.

3. The combination, substantially as set forth, of a casing-head for a rotary-blower, a stuffing-box formed therein, a shaft through said stuffing-box, a journal-bearing for said shaft disposed in front of and a distance away from the open end of said stuffing-box, a packing-gland in said stuffing-box provided with facial bosses and split diametrically through the bore of the gland and through said bosses, and screws arranged to force the gland into the stuffing-box and provided with recesses surrounding said bosses and holding the two halves of the gland together.

4. The combination, substantially as set forth, of a casing-head for a rotary-blower, a stuffing-box formed therein, a shaft through said stuffing-box, a journal-bearing for said shaft disposed in front of and a distance away from the open end of said stuffing-box, a packing-gland in said stuffing-box provided with facial bosses and split diametrically through the bore of the gland and through said bosses, and screws engaging said journal-box and provided upon their inner ends with recessed heads surrounding said bosses and holding the two halves of the gland together.

WILLIAM W. WAINWRIGHT.

Witnesses:
GEO. H. FULLERTON, JR.,
LOU R. CONNER.